Feb. 20, 1923.
C. E. DURYEA
STEP FOR MOTOR VEHICLES
Filed Feb. 12, 1921
1,445,670
2 sheets-sheet 1
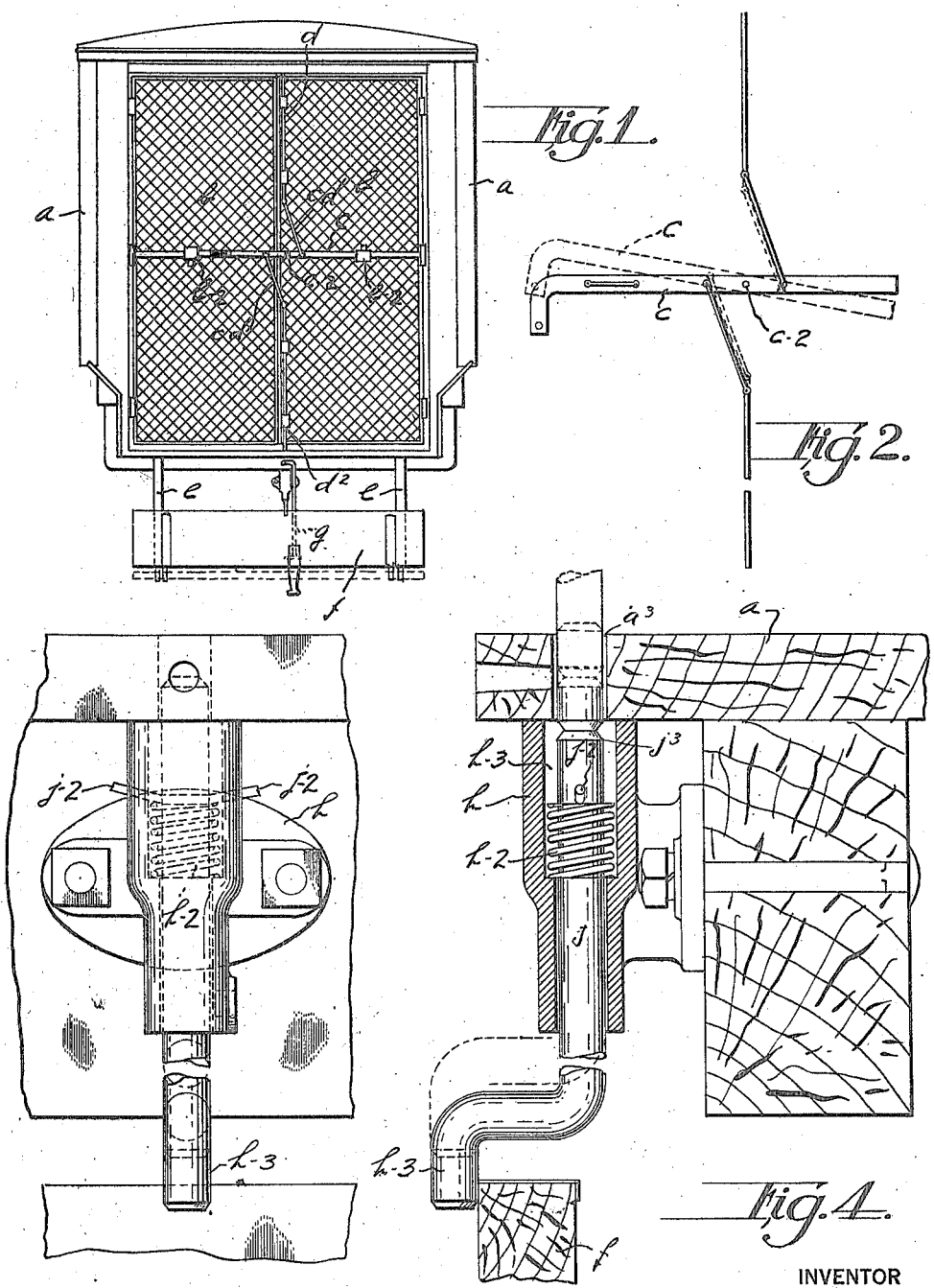
INVENTOR
CHARLES E. DURYEA
BY ATTORNEY
Ralzemond A. Parker Feb. 20, 1923. 1,445,670
C. E. DURYEA
STEP FOR MOTOR VEHICLES
Filed Feb. 12, 1921 2 sheets-sheet 2
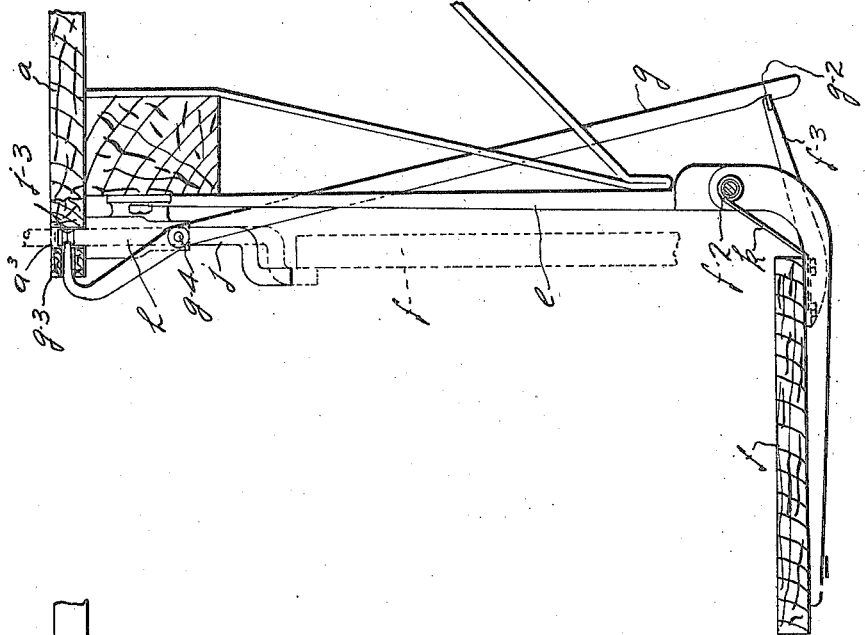
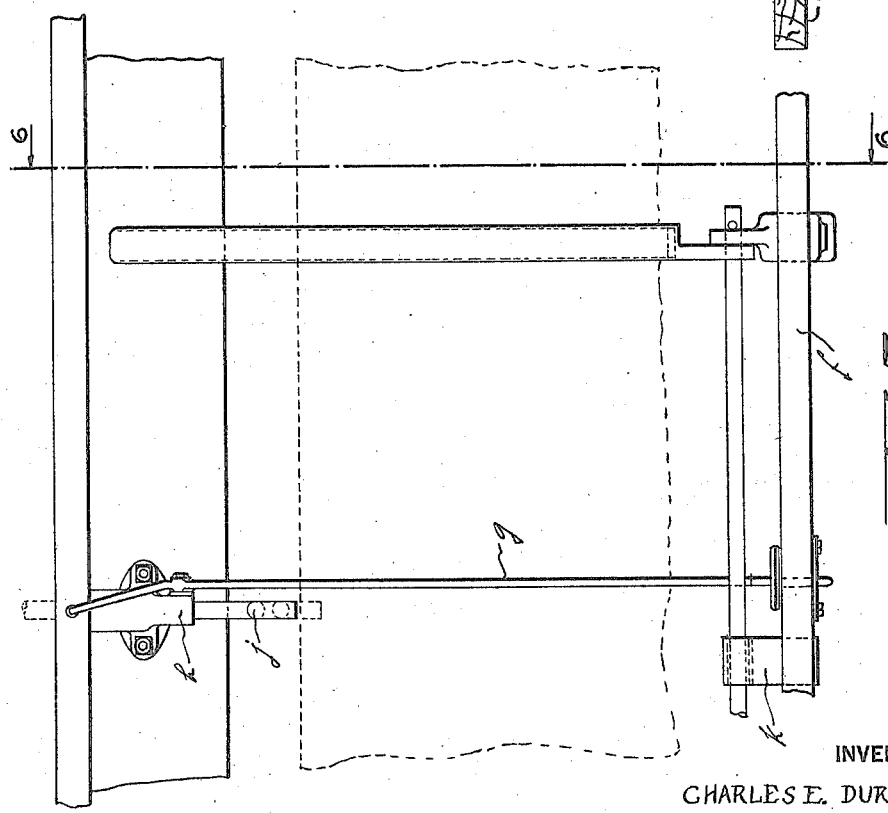
INVENTOR
CHARLES E. DURYEA
BY ATTORNEY
Ralzemond A. Parker Patented Feb. 20, 1923.

1,445,670

UNITED STATES PATENT OFFICE.

CHARLES E. DURYEA, OF PHILADELPHIA, PENNSYLVANIA, ASSIGNOR TO THE REO MOTOR CAR COMPANY, OF LANSING, MICHIGAN.

STEP FOR MOTOR VEHICLES.

Application filed February 12, 1921. Serial No. 444,316.

*To all whom it may concern:*

Be it known that I, CHARLES E. DURYEA, citizen of the United States, residing at Philadelphia, county of Philadelphia, State of Pennsylvania, have invented a certain new and useful Improvement in Steps for Motor Vehicles, and declare the following to be a full, clear, and exact description of the same, such as will enable others skilled in the art to which it pertains to make and use the same, reference being had to the accompanying drawings, which form a part of this specification.

My invention relates to steps for motor vehicles and a special object of my improvements is to provide an improved folding step for an enclosed commercial vehicle.

In the accompanying drawing:

Figure 1 is a rear elevation of an apparatus embodying my invention and so much of a vehicle as is necessary to illustrate its connection therewith.

Fig. 2 is a detached view to an enlarged scale of a door locking mechanism of a vehicle.

Fig. 3 is a detailed elevation of the step securing mechanism to an enlarged scale.

Fig. 4 is a side view partly in section of the part shown in Fig. 3, also showing a portion of the step secured in its inoperative position.

Fig. 5 is a rear elevation of a part of the step and operating mechanism.

Fig. 6 is a side view partly in section of the apparatus shown in Fig. 5.

$a\ a$ is the enclosed body of a vehicle and $b\ b$ are the doors controlling the opening into said body from the rear. $c$ is a locking bar pivoted at $c^2$ and adapted to engage suitably shaped lugs on the doors $b\ b$ at $b^2$ $b^2$. $d$ and $d^2$ are vertically reciprocating bolts on a door $b$ the ends of which are adapted when the bolts are thrust outward to engage in sockets in the frame of the vehicle and vehicle top. $c\ d\ c\ d$ are connecting rods pivoted to the inner ends of the bolts $d$ and $d^2$ and at their other ends to the rod $c$ at equal distances on opposite sides of the pivot $c^2$. $h$ is a casting secured below the floor of the body $a$ at the rear edge thereof and near the center. The casting $h$ has a vertical aperture $h^3$ therethrough to serve as a guideway. The guideway or aperture through the casting $h$ is continued in a passage $a^3$ through the floor of the body $a$ (Fig. 4). $j$ is a bolt adapted to reciprocate vertically in the guideway or passage $h^3$ and in the continuation $a^3$ of said passage. $j^2\ j^2$ are pins extending laterally from the bolt $j$ into the guideways or slots in the wall of the casting $h$ so as to prevent the rotation of the bolt $j$. The lower end of said bolt is bent outward and downward (Fig. 4) to form an engaging part for the step in its elevated or closed position.

$e\ e$ are hangers extending below the bottom of the body $a$. $f$ is a step pivoted at $f^2$ so as to turn upon a transverse horizontal axis bearing in the lower ends of the hangers $e\ e$. $f^3$ is a catch rigidly secured to the step $f$ and extending backward therefrom. $g$ is a bar pivoted at $g^4$ to a stationary support, which may be the casting $h$, so as to oscillate in a longitudinal vertical plane. $j^3$ is a notch with slanting walls formed in the outer and upper end of the bolt $j$. $g^2$ is a notch formed in the lower end of the rod $g$ adapted to engage the catch $f^3$ when the step $f$ is in its lower or horizontal position and hold it in said position. The rod $g$ is bent so as to extend inward longitudinally at its upper end and the inner end of the bent portion is chamfered to fit in the notch $j^3$ in the bolt $j$.

$k$ is a spring acting to throw the step $f$ into its vertical position as indicated by broken lines in Fig. 6. The lower end of the bolt $d^2$ fits and is adapted to reciprocate in the aperture $a^3$ in the floor of the body $a$. $h^2$ (Fig. 4) is a retracting spring acting to force the bolt $j$ to the uper end of its travel.

The operation of the above described device is as follows,—

The doors $b\ b$ being unlocked the bolt $d^2$ is raised out, or partly out, of the aperture in the bottom of the body $a$ and the spring $h^2$ forces the bolt $j$ to the upper limit of its travel. Now the step $f$ may be turned downward to the position shown in Fig. 6 and the rod or catch $f^3$ will then engage in the notch $g^2$ of the rod $g$ and the upper end of said rod will engage in the notch $j^3$ in the bolt $j$, thus the step will be held in its horizontal or operative position when the doors $b\ b$ are free to open and close.

When the doors $b\ b$ are shut and the pivoted rod $c$ is turned to its locking position, as shown in Fig. 1, engaging the lugs $b^2\ b^2$ on said doors, the bolts $d$ and $d^2$ are forced outward and engage in their respective sockets, the bolt $d^2$ striking against the upper end of the bolt $j$ forcing the latter downward, thus oscillating the rod $g$ by the cam action of the side of the notch $j^3$ on the end of said rod, releasing the catch $f^3$ and permitting the spring $k$ to force the step $f$ to its vertical position, the bolt $j$ being forced further downward engages over the upper edge of the step $f$, as shown most distinctly in Fig. 4, thus holding the step in its vertical or inoperative position when the doors $b$ $b$ are closed and locked.

Claims:

1. In combination with a vehicle body having a door, a locking apparatus for said door, a step adapted to be adjusted to an operative or inoperative position and means whereby said locking apparatus shall act to lock said step in its inoperative position.

2. In combination with a vehicle body, a door for said body, means for locking said door, a step adapted to occupy an operative or inoperative position, means for automatically throwing said step into inoperative position and means whereby the locking of said door shall permit of said step being thrown into its inoperative position.

3. In an apparatus of the kind described, a door, a lock for said door having a vertically reciprocating bolt, a step adapted to occupy an operative or inoperative position, a vertically reciprocating bolt adapted to engage said step and hold the same in its inoperative position or to release said step, and means whereby the door bolt shall force the step engaging bolt into its engaging position and hold it there when the door is locked.

4. The combination of a door locking apparatus, substantially as shown and described, having the vertically reciprocating bolt $d^2$, a step adapted to occupy an operative or inoperative position, a spring acting to throw said step into its inoperative position, a bolt adapted to be actuated by the bolt $d^2$ and to engage said step in its inoperative position, a catch for retaining said step in its operative position and means whereby the movement of the step engaging bolt shall trip said catch.

5. In an apparatus of the kind described, doors $b$, $b$ having longitudinally reciprocating securing bolts $d$, $d^2$, a step adapted to be adjusted to an operative or inoperative position, means for holding said step in its operative position, means for reciprocating said bolts, said step securing means being so constructed and located that it shall act upon the securing means of the step to release the same when said bolt is in its position for securing the door.

6. In an apparatus of the kind described, doors $b$, $b$ having longitudinally reciprocating securing bolts $d$, $d^2$, a step adapted to be adjusted to an operative or inoperative position, means for holding said step in its operative position, means for reciprocating said bolts, said step securing means being so constructed and located that it shall act upon the securing means of the step to release the same when said bolt is in its position for securing the door, and means for securing said step in its inoperative position operable by said securing bolt.

7. In apparatus of the kind described, a door, a bolt adapted to be reciprocated to lock said door, a step adapted to be adjusted to an operative and an inoperative position, and means operative by said bolt for releasing said step from its operative position and then securing said step in its inoperative position.

In testimony whereof, I sign this specification.

CHARLES E. DURYEA.